(12) United States Patent
Shtilman et al.

(10) Patent No.: US 9,563,678 B2
(45) Date of Patent: Feb. 7, 2017

(54) SYSTEMS AND METHODS FOR INDEXING AND SEARCHING REPORTING DATA

(71) Applicant: Avaya Inc., Basking Ridge, NJ (US)

(72) Inventors: Ariel Shtilman, Tel Aviv (IL); Arkady Karpman, Hod Hasharon (IL)

(73) Assignee: Avaya Inc., Basking Ridge, NJ (US)

( * ) Notice: Subject to any disclaimer, the term of this patent is extended or adjusted under 35 U.S.C. 154(b) by 165 days.

(21) Appl. No.: 14/194,260

(22) Filed: Feb. 28, 2014

(65) Prior Publication Data

US 2014/0250097 A1   Sep. 4, 2014

Related U.S. Application Data

(60) Provisional application No. 61/772,276, filed on Mar. 4, 2013.

(51) Int. Cl.
*G06F 17/30* (2006.01)
*G06Q 10/10* (2012.01)

(52) U.S. Cl.
CPC ..... *G06F 17/30563* (2013.01); *G06F 17/3043* (2013.01); *G06Q 10/10* (2013.01)

(58) Field of Classification Search
CPC ............ G06F 17/30017; G06F 17/3002; G06F 17/30769; G06F 17/30097; G06F 17/30312; G06F 17/30321; G06F 17/30864; G06F 17/3043; G06F 17/30563
USPC ........................................................ 707/709
See application file for complete search history.

(56) References Cited

U.S. PATENT DOCUMENTS

| | | | | |
|---|---|---|---|---|
| 6,643,641 | B1* | 11/2003 | Snyder | G06F 17/30864 707/709 |
| 2003/0140035 | A1* | 7/2003 | Burrows | G06F 17/30911 |
| 2005/0055353 | A1* | 3/2005 | Marx | G08G 1/205 |
| 2012/0078859 | A1* | 3/2012 | Vaitheeswaran | G06F 17/30864 707/693 |
| 2012/0246139 | A1* | 9/2012 | Rao | G06F 17/30864 707/709 |
| 2013/0173606 | A1* | 7/2013 | Pasumarthi | G06F 17/30336 707/723 |
| 2013/0226900 | A1* | 8/2013 | Sharma | G06F 17/30864 707/711 |
| 2013/0283203 | A1* | 10/2013 | Batraski | G06F 17/3005 715/783 |
| 2013/0325851 | A1* | 12/2013 | Crudele | G06F 17/3005 707/722 |

* cited by examiner

*Primary Examiner* — Syed Hasan
*Assistant Examiner* — Saba Ahmed

(57) ABSTRACT

A data management system for indexing reporting data of a contact center is disclosed. The data management system includes one or more reporting systems configured to store the reporting data. The data management system further includes a crawler configured to collect the reporting data from the one or more reporting systems. The data management system further includes one or more plug-in interfaces configured to enable the crawler to retrieve the reporting data from the one or more reporting systems. The data management system further includes an indexing server configured to index and store the collected contact center reporting data.

14 Claims, 8 Drawing Sheets

| Index Server Mapping | Dictionary Item |
|---|---|
| Agent | Agent |
| | Person |
| | Agent ID |
| Skill | Skill |
| | Hunt |
| | Capability |

FIG. 4B

SYSTEMS AND METHODS FOR INDEXING AND SEARCHING REPORTING DATA

CROSS-REFERENCE TO RELATED APPLICATIONS

This application claims the benefit of U.S. Provisional Patent Application Ser. No. 61/772,276, filed Mar. 4, 2013, entitled "CONTACT CENTER REPORTING INDEXING AND SEARCH", which is incorporated herein by reference in its entirety.

BACKGROUND

Field of the Invention

Embodiments of the present invention generally relate to a system and method for managing data of a contact center and particularly to a system and method for indexing and searching the data of the contact center.

Description of Related Art

Contact centers are employed by many enterprises to service inbound and outbound contacts from customers. A typical contact center includes a switch and/or server to receive and route incoming packet-switched and/or circuit-switched contacts and one or more resources, such as human agents and automated resources (e.g., Interactive Voice Response (IVR) units), to service the incoming contacts or work items. Contact centers distribute contacts, whether inbound or outbound, for servicing to any suitable resource according to predefined criteria. In many existing systems, the criteria for servicing the contact from the moment that the contact center becomes aware of the contact until the contact is connected to an agent are client or operator-specifiable (i.e., programmable by the operator of the contact center), via a capability called vectoring. Normally in present-day Automatic Call Distributions (ACDs) when the ACD system controller detects that an agent has become available to handle a contact, the controller identifies all predefined contact-handling queues for the agent (usually in some order of priority) and delivers to the agent the highest-priority, oldest contact that matches the agent's highest-priority queue. Generally, the only condition that results in a contact not being delivered to an available agent is that there are no contacts waiting to be handled.

The primary objective of contact center management is to ultimately maximize contact center performance and profitability. An ongoing challenge in contact center administration is monitoring and optimizing contact center efficiency. The contact center efficiency is generally measured in two ways that are service level and match rate.

Service level is one measurement of the contact center efficiency. Service level is typically determined by dividing the number of contacts accepted within the specified period by the number accepted plus the number that were not accepted, but completed in some other way (e.g., abandoned, given busy, canceled, flowed out etc.). Of course, service level definitions may vary from one enterprise to another.

Match rate is another indicator used in measuring the contact center efficiency. Match rate is usually determined by dividing the number of contacts accepted by a primary skill level agent within a period of time by the number of contacts accepted by any agent for a queue over the same period. An agent with a primary skill level is one that typically can handle contacts of a certain nature most effectively and/or efficiently. There are other contact center agents that may not be as proficient as the primary skill level agent, and those agents are identified either as secondary skill level agents or backup skill level agents. As can be appreciated, contacts received by a primary skill level agent are typically handled more quickly and accurately or effectively (e.g., higher revenue attained) than a contact received by a secondary or even backup skill level agent. Thus, it is an objective of most contact centers to optimize match rate along with service level.

In addition to service level and match rate performance measures, contact centers use other Key Performance Index (KPI), such as revenue, estimated, actual, or predicted wait time, average speed of answer, throughput, agent utilization, agent performance, agent responsiveness and the like, to calculate performance relative to their Service Level Agreements (SLAs). Operational efficiency is achieved when KPI are managed near, but not above, SLA levels.

Throughput is a measure of the number of calls/contact requests or work requests that can be processed in a given amount of time. Agent utilization is a measure of how efficiently agents' time is being used. Customer service level is a measure of the time customers spend waiting for their work to be handled. Company contact center customers wish to provide service to as many requests as possible in a given amount of time, using the least number of agents to do so, and minimizing the wait time for their customers that can increase the service level agreement of the contact center.

Typically, historical data or information of customers and agents, their behavior, workforce management etc. is stored in different data repositories or databases in the contact center. Further, vendors of the contact center do not provide a technique to store all the data in a single data repository. However, an agent of the contact center may have to access multiple data repositories to retrieve the data for providing services to customers. Further, in conventional databases, the data is stored in tables that include columns with restricted character length of business names of entities such as, ACD calls, hold ACD time, and so forth and an agent is not allowed to create columns with long names in the databases as per the convenience. Also, if the agent is not an expert or is not familiar with business definitions or textual descriptions of the entities, he may have to search files or documents of probably 1000 pages to look for the definition of the entities. Further, a manager or supervisor of the contact center may have to run a full report that includes data of all the agents of the contact center to search for a best agent on a particular day. A best agent is one that typically can handle maximum number of contacts in a day. However, such techniques are time-consuming and may also increase hold time of a call that may further affect the contact center efficiency. Furthermore, the agent may not be able to access all the relevant data from the different databases to provide satisfactory services to the customers.

There is thus a need for a system and method for indexing and storing the historical data and further enables the agent of the contact center to access the data in a faster way.

SUMMARY

Embodiments in accordance with the present invention provide a data management system for indexing reporting data of a contact center. The data management system includes one or more reporting systems configured to store the reporting data. The data management system further includes a crawler configured to collect the reporting data from the one or more reporting systems. The data management system further includes one or more plug-in interfaces configured to enable the crawler to retrieve the reporting data from the one or more reporting systems. The data management system further includes an indexing server configured to index and store the collected contact center reporting data.

Embodiments in accordance with the present invention further provide a computer-implemented method for indexing reporting data of a contact center. The computer-implemented method includes retrieving one or more connection details and one or more lists of reporting systems from a configuration database, collecting, by a crawler, the reporting data at predefined intervals from the one or more lists of reporting systems, and storing the collected reporting data into an indexing server, wherein the collected reporting data is stored along with one or more dictionary items.

Embodiments in accordance with the present invention further provide a computer-implemented method for searching reporting data of a contact center. The method includes receiving one or more search queries from a user, segmenting the one or more search queries into a plurality of different phrases, matching the plurality of different phrases with one or more dictionary items, performing one or more lookups on a plurality of indexes based on the one or more search queries received from the user, and displaying one or more search query results to the user.

The present invention can provide a number of advantages depending on its particular configuration. First, the present invention provides indexing of historical reporting data of the contact center. The indexing of the reporting data may help a user to access the reporting data from multiple reporting systems or databases in a faster way. Further, the present invention enables the user to access all the relevant reporting data related to customers and agent's behavior, call recordings of customers, workforce management etc. stored in the multiple reporting systems in a convenient way. Also, the present invention retrieves the reporting data in a form as it is stored in the reporting system. For example, if a reporting system stores a table with 50 different callers, then the present invention retrieves structure of the table as it is from the reporting system. Further, the present invention indexes the reporting data and stores it in multiple indexes of an indexing server, so that an agent of the contact center may easily access the data.

Further, the reporting data retrieved from the reporting system is stored in the indexing server by combining the reporting data with dictionary items of a dictionary database. The dictionary items may include business definitions of reporting entities (e.g., ACD calls, ACD abandoned calls etc.). For example, if a manager triggers a query for an agent having more than 50 calls, then the present invention performs lookup for a statistical value that is bigger from a mathematical perspective than the statistical value of the search query i.e., 50. The present invention also provides additional information such as, textual description of the reporting entities to the agents of the contact center along with search query results.

These and other advantages will be apparent from the disclosure of the present invention(s) contained herein.

The preceding is a simplified summary of the present invention to provide an understanding of some aspects of the present invention. This summary is neither an extensive nor exhaustive overview of the present invention and its various embodiments. It is intended neither to identify key or critical elements of the present invention nor to delineate the scope of the present invention but to present selected concepts of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings, and wherein:

FIG. 4B illustrates indexing server matching of reporting entities with dictionary items according to an embodiment of the present invention;

Figure 1:
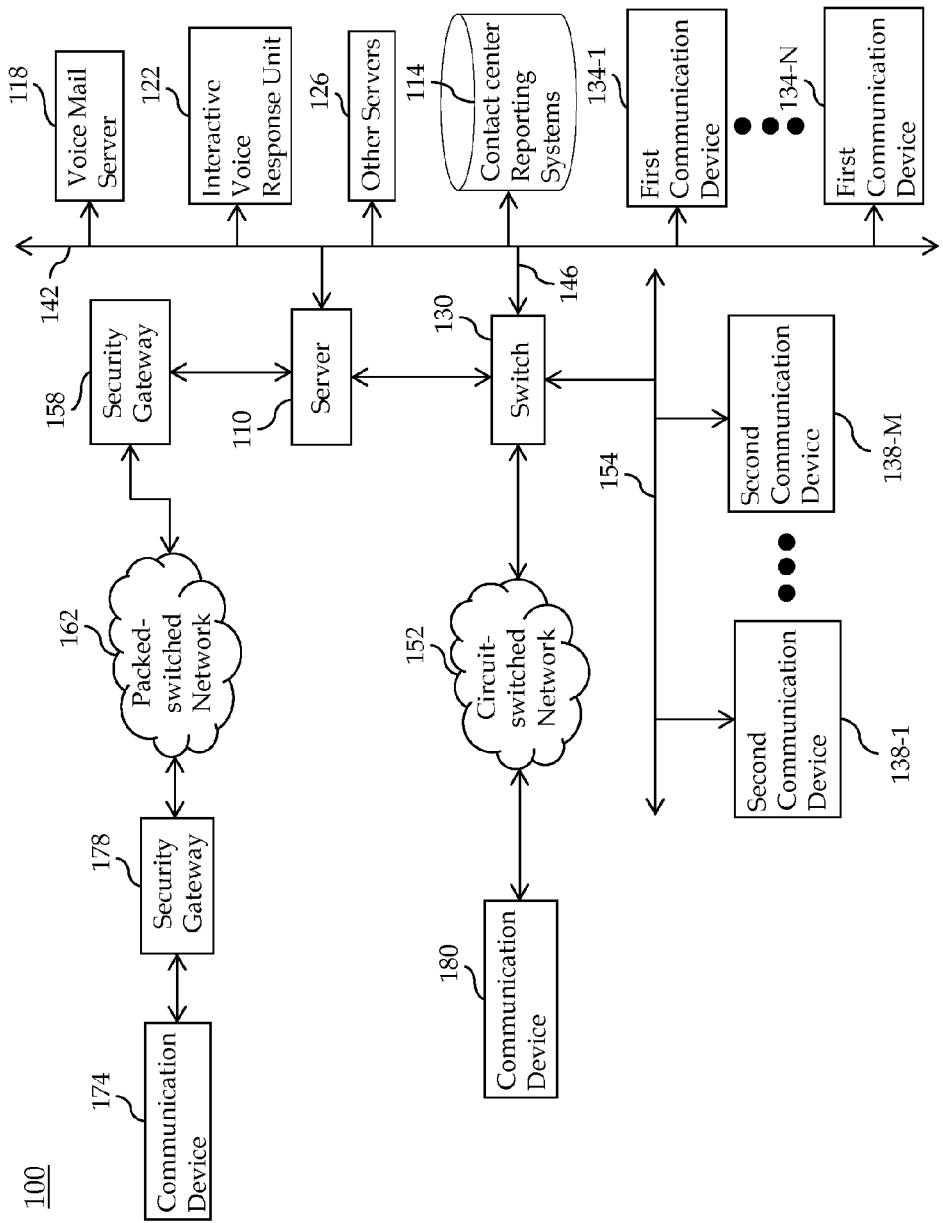
FIG. 1 illustrates a block diagram depicting a contact center according to an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

The present invention will be illustrated below in conjunction with an exemplary communication system, e.g., the Avaya Aura® system. Although well suited for use with, e.g., a system having an Automatic Call Distribution (ACD) or other similar contact processing switch, the present invention is not limited to any particular type of communication system switch or configuration of system elements. Those skilled in the art will recognize the disclosed techniques may be used in any communication application in which it is desirable to provide improved contact processing.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read.

A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the present invention is considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present invention is described in terms of exemplary embodiments, it should be appreciated those individual aspects of the present invention can be separately claimed.

The term "switch" or "server" as used herein should be understood to include a Private Branch Exchange (PBX), an ACD, an enterprise switch, or other type of communications system switch or server, as well as other types of processor-based communication control devices such as media servers, computers, adjuncts, etc.

FIG. 1 shows an illustrative block diagram of a contact center according to an embodiment of the present invention. The contact center 100 comprises a server 110, a set of contact center reporting systems or databases 114 containing historical data or information related to customers and agent's behavior, call recordings, workforce management and other information that may enhance the value and efficiency of the contact processing, and a plurality of servers, namely a voice mail server 118, an Interactive Voice Response unit (e.g., IVR) 122, and other servers 126, a switch 130, a plurality of working agents operating packet-switched (first) communication devices 134-1-N (such as computer work stations or personal computers), and/or circuit-switched (second) communication devices 138-1-M, all interconnected by a Local Area Network (LAN) 142, (or Wide Area Network (WAN)). The servers may be connected via optional communication lines 146 to the switch 130. As will be appreciated, the other servers 126 may also include a scanner (which is normally not connected to the switch 130 or Web Server), VoIP software, video call software, voice messaging software, an IP voice server, a fax server, a web server, an email server, and the like. The switch 130 is connected via a plurality of trunks to a circuit-switched network 152 (e.g., Public Switch Telephone Network (PSTN)) and via link(s) 154 to the second communication devices 138-1-M. A security gateway 158 is positioned between the server 110 and a packet-switched network 162 to process communications passing between the server 110 and the packet-switched network 162. The security gateway 158 may be implemented as hardware such as via an adjunct processor (as shown) or as a chip in the server.

Although the preferred embodiment is discussed with reference to client-server architecture, it is to be understood that the principles of the present invention apply to other network architectures. For example, the present invention applies to peer-to-peer networks, such as those envisioned by the Session Initiation Protocol (SIP). In the client-server model or paradigm, network services and the programs used by end users to access the services are described. The client side provides a user with an interface for requesting services from the network, and the server side is responsible for accepting user requests or search queries for services and providing the services transparent to the user. By contrast in the peer-to-peer model or paradigm, each networked host runs both the client and server parts of an application program. Additionally, the present invention does not require the presence of packet- or circuit-switched networks.

The switch 130 and/or server 110 may be any architecture for directing contacts to one or more communication devices. In some embodiments of the present invention, the switch 130 may perform load-balancing functions by allocating incoming or outgoing contacts among a plurality of logically and/or geographically distinct contact centers. Illustratively, the switch 130 and/or server 110 may be a modified form of the subscriber-premises equipment sold by Avaya Inc. under the names Definity™ Private-Branch Exchange (PBX) based ACD system, MultiVantage™ PBX, Communication Manager™, S8300™ media server and any other media servers, SIP Enabled Services™, Intelligent Presence Server™, and/or Avaya Interaction Center™, and any other products or solutions offered by Avaya or another company. Typically, the switch 130/server 110 is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide ACD functionality. Other types of known switches and servers are well known in the art and therefore not described in detail herein.

The first communication devices 134-1-N are packet-switched and may include, for example, IP hardphones such as the Avaya Inc.'s, 4600 Series IP Phones™, IP softphones such as Avaya Inc.'s, IP Softphone™, Personal Digital Assistants (PDAs), Personal Computers (PCs), laptops, packet-based H.320 video phones and conferencing units, packet-based voice messaging and response units, packet-based traditional computer telephony adjuncts, peer-to-peer based communication devices, and any other communication device.

The second communication devices 138-1-M are circuit-switched. Each of the communication devices 138-1-M corresponds to one of a set of internal extensions Ext1-M, respectively. The second communication devices 138-1-M may include, for example, wired and wireless telephones, PDAs, H.320 videophones and conferencing units, voice messaging and response units, traditional computer telephony adjuncts, and any other communication device.

It should be noted that the present invention does not require any particular type of information transport medium between switch, or server and first and second communication devices, i.e., the present invention may be implemented with any desired type of transport medium as well as combinations of different types of transport channels. In an embodiment of the present invention, a communication network may also be a cloud based network.

The packet-switched network 162 may be any data and/or distributed processing network, such as the Internet. The packet-switched network 162 typically includes proxies (not shown), registrars (not shown), and routers (not shown) for managing packet flows.

The packet-switched network 162 as shown in FIG. 1 is in communication with a first communication device 174 via a security gateway 178, and the circuit-switched network 152 with an external second communication device 180.

In a preferred configuration, the server 110, the packet-switched network 162, and the first communication devices 134-1-N are Session Initiation Protocol (SIP) compatible and can include interfaces for various other protocols such as the Lightweight Directory Access Protocol (LDAP), H.248, H.323, Simple Mail Transfer Protocol (SMTP), Internet Message Access Protocol 4 (IMAP4), Integrated Services Digital Network (ISDN), E1/T1, and analog line or trunk.

It should be emphasized that the configuration of the switch 130, the server 110, user communication devices, and other elements as shown in FIG. 1 is for purposes of illustration only and should not be construed as limiting the present invention to any particular arrangement of elements.

As will be appreciated, the server 110 is notified via the LAN 142 of an incoming work item by the communications component (e.g., the switch 130, fax server, email server, Web Server, and/or other server) receiving the incoming work item as shown in FIG. 1. The incoming work item is held by the receiving telecommunications component until the server 110 forwards instructions to the component to forward or route the contact to a specific contact center resource, such as the IVR unit 122, the voice mail server 118, and/or first or second telecommunication devices 134-1-N, 138-1-M associated with a selected agent. The server 110 distributes and connects these work items to telecommunication devices of available agents based on the predetermined criteria noted above. When the server 110 forwards a voice contact (or first work item) to an agent, the server 110 also forwards customer-related information from the contact center reporting systems or database 114 to the agent's computer work station for viewing (such as by a pop-up display) to permit the agent to better serve the customer to achieve desired business goals (e.g., an average revenue, a customer satisfaction (CSAT), a service level agreement etc.) of the contact center. Depending on the contact center configuration and current status of the business goals, the server 110 may reallocate the work items to the agents. The agents process the work items or contacts sent to them by the server 110. This embodiment is particularly suited for a Customer Relationship Management (CRM) environment in which customers are permitted to use any media to contact a business. In a CRM environment, both real-time and non-real-time contacts must be handled and distributed with equal efficiency and effectiveness.

Figure 2:
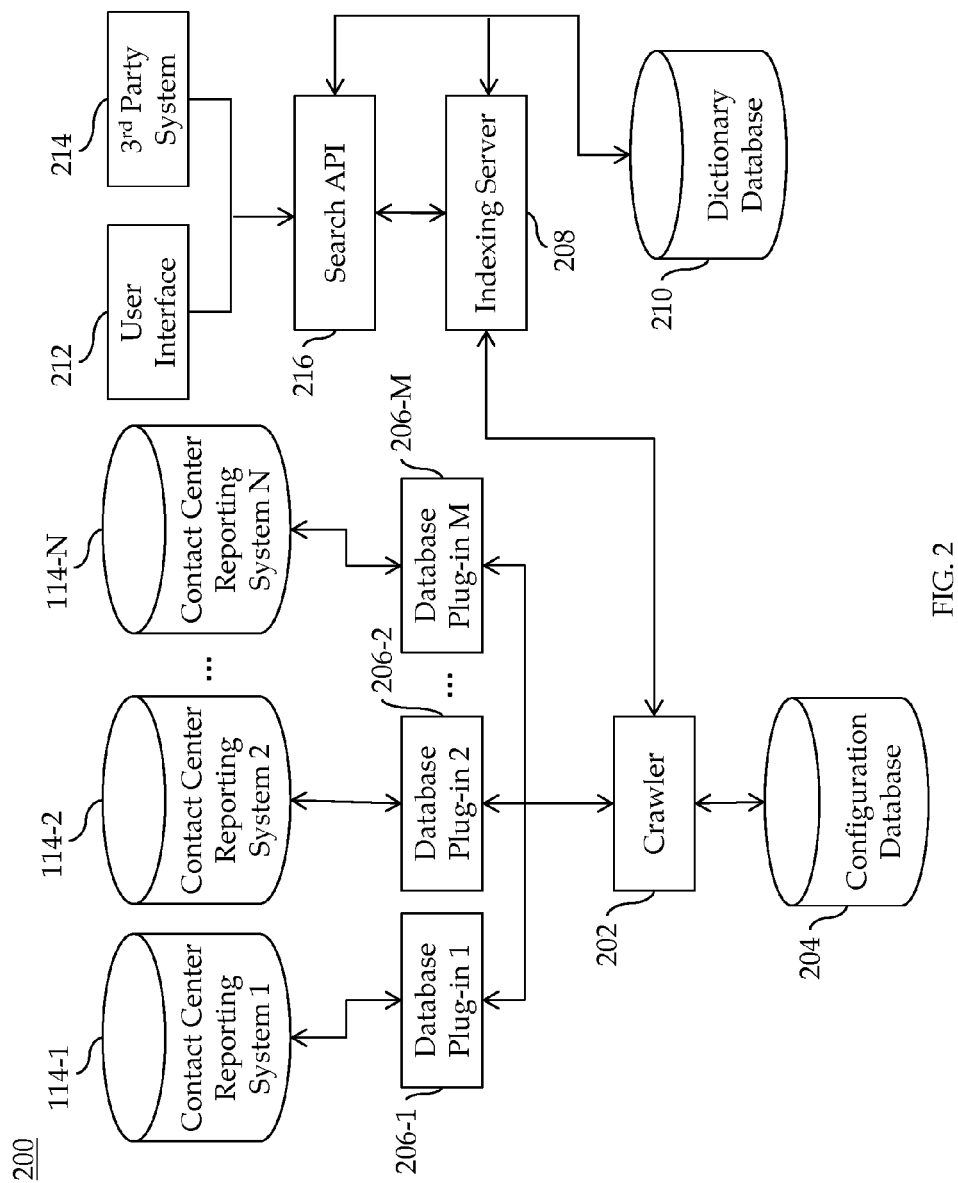
FIG. 2 illustrates block diagram of a data management system according to an embodiment of the present invention.

FIG. 2 illustrates block diagram of a data management system 200 according to an embodiment of the present invention. The data management system 200 includes a plurality of contact center reporting systems or databases 114-1-N, a crawler 202, a configuration database 204, and a plurality of database plug-in interfaces 206. In an embodiment of the present invention, the plurality of reporting systems 114-1-N may include reporting data or information such as, but is not restricted to, reporting data or information related to customers and agent's behavior, call recordings, workforce management, and so forth. The plurality of reporting systems 114-1-N may store historical reporting data of the contact center in an embodiment of the present invention. The contact center reporting systems 114-1-N may be a set of relational databases (for example, ORACLE SQL® databases, DB2® from IBM etc.) configured to store reporting data in an embodiment of the present invention. In an embodiment of the present invention, the reporting systems 114-1-N may be a set of non-relational databases configured to store the reporting data. The plurality of reporting systems 114-1-N may also include a set of relational databases with a set of non-relational databases in another embodiment of the present invention.

The crawler 202 is configured to automatically and repeatedly crawl in a Local Area Network (LAN) or Wide Area Network (WAN) environment that includes the plurality of contact center reporting systems 114-1-N. In an embodiment of the present invention, the LAN and WAN environment may be a contact center environment. Further, the crawler 202 is configured to access the contact center reporting systems 114-1-N at predefined intervals for collecting the reporting data of the contact center. The predefined intervals may include, but is not restricted to, an intraday interval, a daily interval, a weekly interval, and a monthly interval. In the intra daily interval, the reporting data is retrieved periodically from the contact center reporting systems 114-1-N at predefined time interval, for example, 1 minute, 15 minutes, 30 minutes, and so forth. In the daily interval, the reporting data is retrieved once a day and includes a single record for the day the customer report on. Next, in the weekly interval, the reporting data is retrieved once a week from the contact center reporting systems 114. Further, in the monthly interval, the reporting data is retrieved once a month from the contact center reporting systems 114-1-N. The predefined intervals may be configured by a user and the configuration of the user is then stored in the configuration database 204. In an embodiment of the present invention, the user may be an agent, a supervisor or a manager of the contact center.

The configuration database 204 may also include connection details of the contact center reporting systems 114-1-N. In an embodiment of the present invention, the connection details may include, but is not restricted to, an Internet Protocol address (IP address), a hostname, communication protocols, usernames and passwords for authenticating with the contact center reporting systems 114, and so forth. The crawler 202 retrieves the connection details of the reporting systems 114 from the configuration database 204. In an embodiment of the present invention, the crawler 202 may retrieve the reporting data from the reporting systems 114-1-N at the predefined intervals by using the connection details of the reporting systems 114-1-N.

Further, the crawler 202 uses the plurality of database plug-in interfaces 206 for retrieving the reporting data from the contact center reporting systems 114-1-N in an embodiment of the present invention. For example, the crawler 202 may use a database plug-in interface to a Microsoft Structured Query language (MSSQL) database, a database plug-in interface to an ORACLE database, and so forth. The plurality of database plug-in interfaces 206 are configured to connect communication links from the crawler 202 to the reporting systems 114 for retrieving the reporting data. For example, if the reporting system 114-1-N stores a table with data for 50 different callers, then the database plug-in interface 206 retrieves the structure of the table as stored in the contact center reporting systems 114-1-N and transmits it to the crawler 202.

In another embodiment of the present invention, the crawler 202 is configured to connect with the reporting systems 114-1-N. The crawler 202 retrieves the reporting data of the contact center from the reporting systems 114-1-N and stores the reporting data into an indexing server 208. The indexing server 208 receives the reporting data from the crawler 202 and stores the reporting data in a memory index of the indexing server 208. For example, if a database table having information of 50 callers is stored in a memory index of the indexing server 208, the data management system 200 enables the user to access the reporting data in a much faster way.

In an embodiment of the present invention, the indexing server 208 combines the reporting data together with dictionary items of a dictionary database 210. The dictionary items may include business definitions of reporting entities in an embodiment of the present invention. The reporting entities may include, but is not restricted to, element types (e.g., agent, skill etc.), index type (e.g., intraday, daily, weekly or monthly), reporting statistics (e.g., ACD calls, ACD abandoned calls etc.), time stamps (e.g., date and time), and mathematical operators (e.g., bigger than, smaller than etc.). In an embodiment of the present invention, the dictionary database 210 may get updated at predefined time interval that is configured based on predefined configurations of a user.

Further, if the user adds a new column for a reporting statistics (e.g., ACD calls) in the contact center reporting systems 114-1-N, then the dictionary database 210 may automatically add a column with a textual description of the reporting statistics. In an embodiment of the present invention, the textual description of the reporting statistics may be modified based on the user needs.

In conventional databases, the reporting data is stored in columns and every column has a name. Typically, a column name is restricted to a predefined character length, such as, 10, as the conventional databases do not allow a user to create columns with names more than the predefined character length. Also, if an agent of the contact center is not an expert or is familiar with business definitions of all the reporting entities, and then the agent has to search for the business definitions of the reporting entities in a file or a document that may include thousands of pages that explain in detail the business definitions of the reporting entities. For example, in conventional systems, an agent searches for a business definition of a reporting entity "hold ACD" time in a database (e.g., dictionary database) that provides a business definition of the "hold ACD" time as the number of seconds a customer call was put on hold if the customer call arrived from the ACD and an agent moves to another customer ACD based call.

In the present invention, the indexing server 208 indexes this textual description and creates a business name that may explain the meaning of the reporting entities. For example, the indexing server 208 indexes the textual description of the "hold ACD" time and creates a business name such as "time customer was on hold". In an embodiment of the present invention, the business name is then stored as a dictionary data or item in the dictionary database 210 together with the reporting data of the contact center. In another embodiment of the present invention, the dictionary items may also include English words of a dictionary.

The data management system 200 further includes a user interface 212 and a third party system 214. In an embodiment of the present invention, the agent of the contact center trigger search queries by using the user interface 212. In an embodiment of the present invention, the search query may be a Structured Query Language (SQL) query. In another embodiment of the invention, the query may be formed in other query languages but not limited to SQL, Java Persistence Query Language (JPQL), or Query By Example (QBE).

The search query of the user is then passed to a search Application Programming Interface (API) 216 that is configured to search for an index logic and access different indexes that are created by the indexing server 208. In an embodiment of the present invention, the search API 216 breaks the user's search query into different words or phrases and then matches the phrases with relevant statistical column from the reporting systems 114-1-N that includes the reporting data. The accessed reporting data is then displayed to the user on the user interface 212 as a search result.

Figure 3:
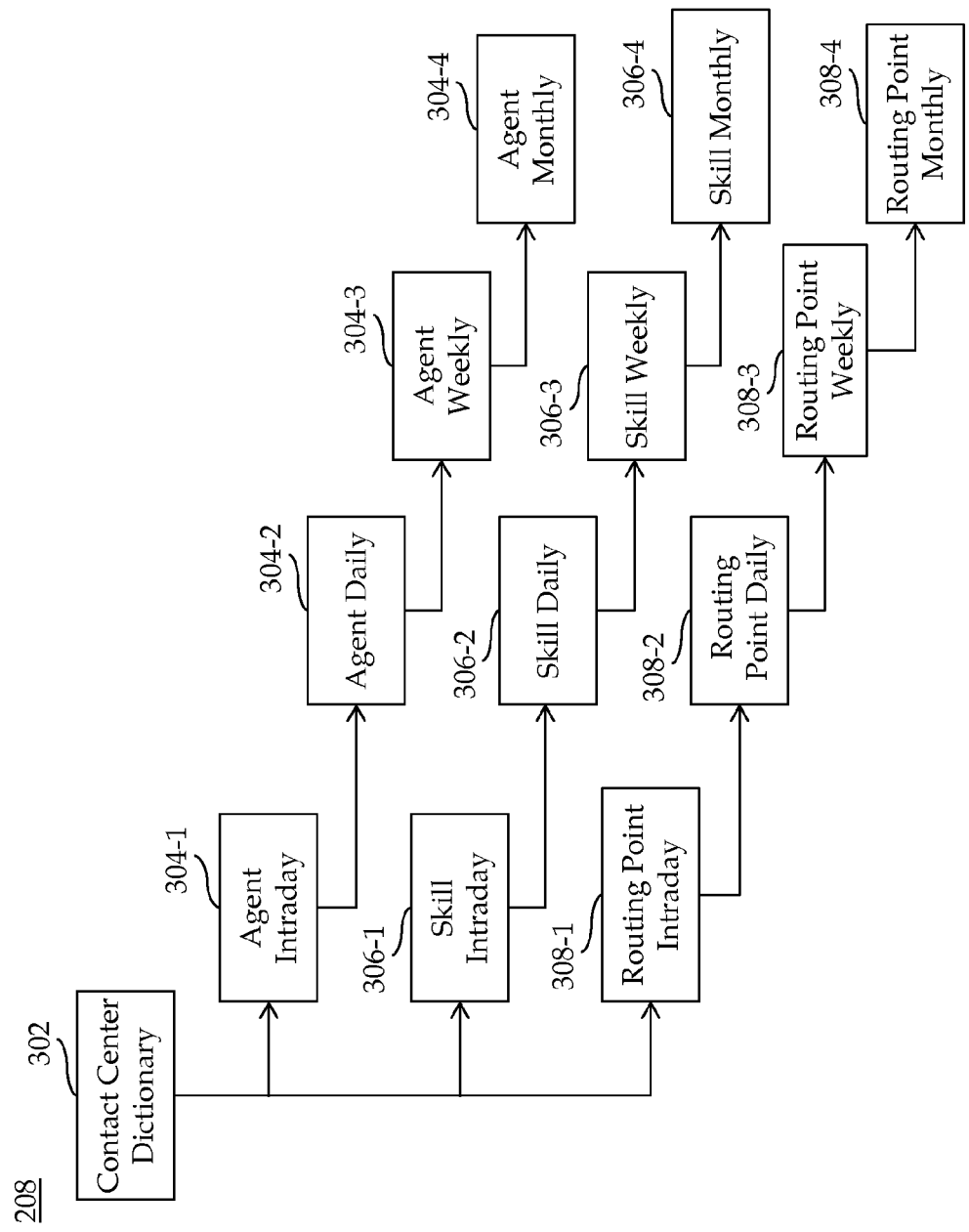
FIG. 3 illustrates block diagram of an indexing server for indexing reporting data of the contact center according to an embodiment of the present invention.

FIG. 3 illustrates block diagram of the indexing server 208 for indexing the reporting data according to an embodiment of the present invention. The index logic of the indexing server 208 explains how indexing of the reporting data is done. In an embodiment of the present invention, the indexing of the reporting data of the contact center is done based on two parameters such as, an indexed entity and a reporting data interval. In an embodiment of the present invention, the indexed entity may include, but is not restricted to, an agent, a skill, a routing point, and so forth. The reporting data intervals may include, but is not restricted to, an intraday interval, a daily interval, a weekly interval, and a monthly interval. In an embodiment of the present invention, indexes of the indexing server 208 are in the form of tables that represent an intra daily index, a daily index, a weekly index, and a monthly index. The indexing server 208 may then match the indexes with the reporting data that is stored together with the dictionary items received from the reporting systems 114 and the dictionary database 210. For example, a contact center dictionary 302 may include, but is not restricted to, index tables such as, an agent intraday index table, a skill intraday index table, a routing point intraday index table, and so forth. The agent intraday index 304-1 may index and store contact center reporting data that is gathered in an intraday interval in an embodiment of the present invention. Further, the agent intraday index 304-1 may include indexed reporting data received periodically from the reporting systems 114 at predefined time interval (e.g., 15 minutes, 30 minutes etc.). In another embodiment of the present invention, the agent intraday index 304-1 may also include information of agents of the contact center received from the contact center reporting systems 114. The information of the agents may include, but is not restricted to, agent name, phone number, address, and so forth.

The agent daily index 304-2 may index and store contact center reporting data that is gathered in a daily interval in an embodiment of the present invention. Further, the agent daily index 304-2 may include reporting data from the contact center reporting systems 114 for each day (e.g., Monday, Tuesday, Wednesday, and so forth). In another embodiment of the present invention, the agent daily index 304-2 may also include information about agents of the contact center received from the contact center reporting systems 114. The information of the agents may include, but is not restricted to, agent name, phone number, address, and so forth.

Further, the agent weekly index 304-3 may index and store contact center reporting data that is gathered in an interval of a week in another embodiment of the present invention. Further, the agent weekly index 304-3 may include reporting data from the contact center reporting systems 114 for each week. In another embodiment of the present invention, the agent weekly index 304-3 may also include information about agents of the contact center received from the contact center dictionary 302. The information of the agents may include, but is not restricted to, agent name, phone number, address, and so forth.

In another embodiment of the present invention, the agent monthly index 304-4 may index and store contact center reporting data that is gathered in an interval of a month. Further, the agent monthly index 304-4 may include reporting data from the contact center reporting systems 114 for each month (e.g., January, February, March, and so forth). In another embodiment of the present invention, the agent monthly index 304-4 may also include information about the agents of the contact center received from the contact center reporting systems 114. The information of the agent may include, but is not restricted to, agent name, phone number, address, and so forth. Similarly, the indexing server 208 may index tables for other reporting element types (e.g., skills, routing point etc.). Therefore, each column of the reporting systems 114 is translated into a business definition that can be searched very quickly and easily.

Figure 4A:
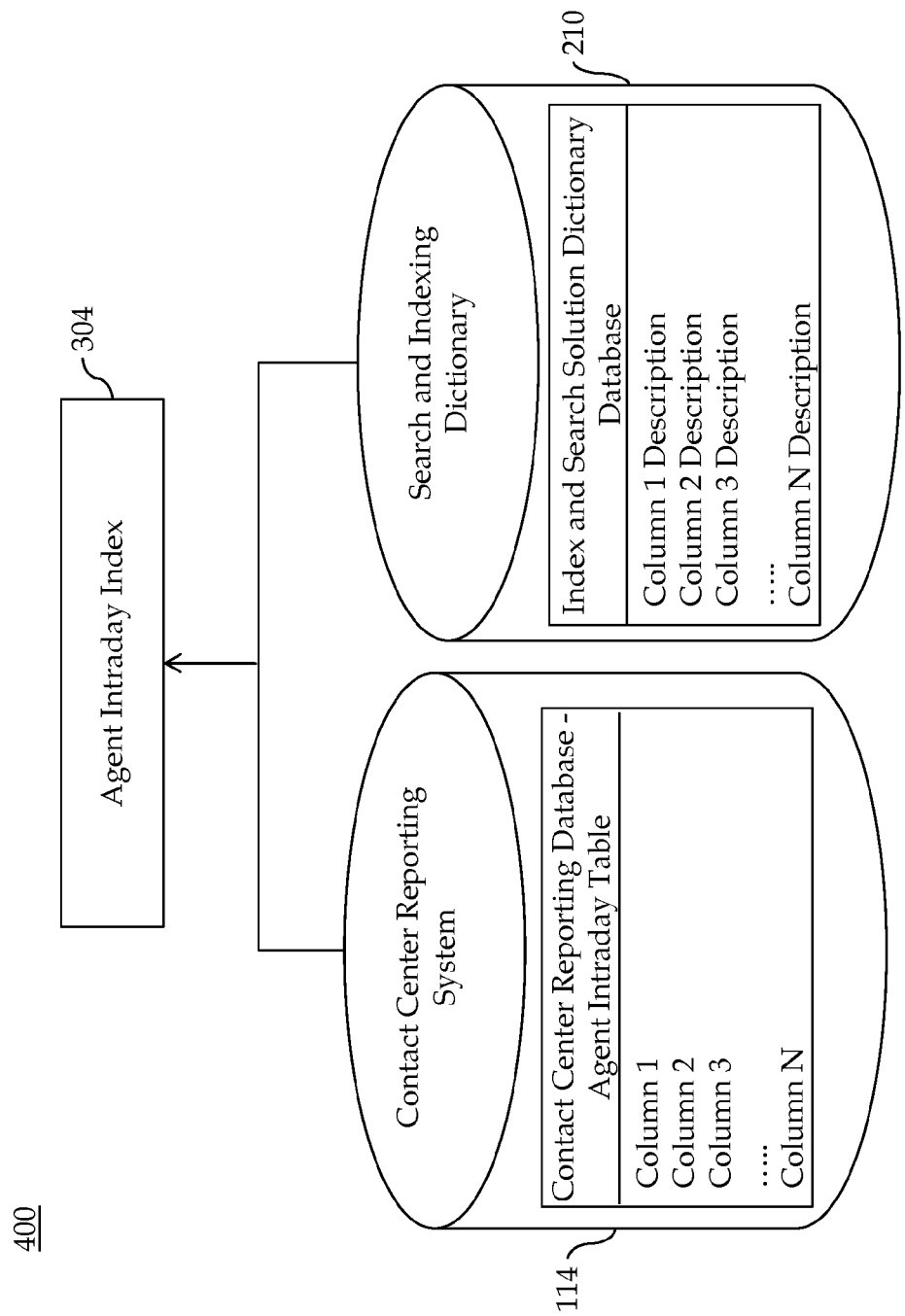
FIG. 4A illustrates block diagram of an agent intraday index of the indexing server to store the reporting data with dictionary items according to an embodiment of the present invention.

FIG. 4A illustrates block diagram of an agent intraday index of the indexing server 208 to store the reporting data with dictionary items according to an embodiment of the present invention. The indexing server 208 matches a specific reporting statistic for example, ACD abandoned call with its business definition retrieved from the dictionary database 210. For example, the indexing server 208 copies the reporting statistic ACD abandoned call and its business definition i.e., number of ACD calls that are abandoned in the queue, of a reporting statistic "ACD abandoned call" and stored it in the agent intraday index table 304. Therefore, when an agent searches for abandoned calls in queue, the data management system 200 knows that the agent desires to search for a column having the reporting statistic ACD abandoned calls in queue and retrieves the data from that column of the index 304. The agent intraday index 304 already stores the data in a table that represents a column with the reporting statistic ACD abandoned call with its textual description received from the dictionary database 210 and then displays result to the user based on the search query.

In another embodiment of the present invention, the indexing server 208 matches one or more contact center reporting entities such as, an agent, or a skill with one or more dictionary items and its synonyms as shown in FIG. 4B. For example, a contact center reporting entity such as, an agent is mapped with one or more dictionary items such as, an agent, a user, or an agent ID. Similarly, a contact center reporting entity such as, skill of an agent is matched with one or more dictionary items such as, a skill, a hunt, or a capability.

In yet another embodiment of the present invention, the indexing server 208 matches one or more mathematical operators (for example, ">", "<" etc.) with the dictionary items. For example, a mathematical operator ">" is matched with a dictionary item "bigger than" or with its synonym "big" and another mathematical operator "<" is matched with a dictionary item "smaller than" or its synonym "small". In an embodiment of the present invention, if a user triggers a search query for a data that is bigger than or smaller than a statistical value in the index, then the indexing server 208 may translate the search query into a relevant mathematical operator in order to search for a relevant result from the agent intraday index 304. For example, if a user triggers a search query get data of an agent having more than 50 calls, then the data management system 200 lookups for a statistical value in the agent intraday index 304 that is bigger from a mathematical perspective than the statistical value of the search query i.e., 50.

Traditionally, if a manager of a contact center desires to search for a best agent (one who answers most of the calls) on Sunday, he needs to export and run a report having information of all the agents of the contact center, and then sort out the information in order to see the best agent of the contact center. In an embodiment of the present invention, the indexing server 208 indexes the reporting data with the dictionary items and searches for an agent that answered maximum number of calls on a day i.e., Sunday, as the data management system 200 knows what day is today and then calculates a time stamp to display a result based on the search query.

Figure 5:
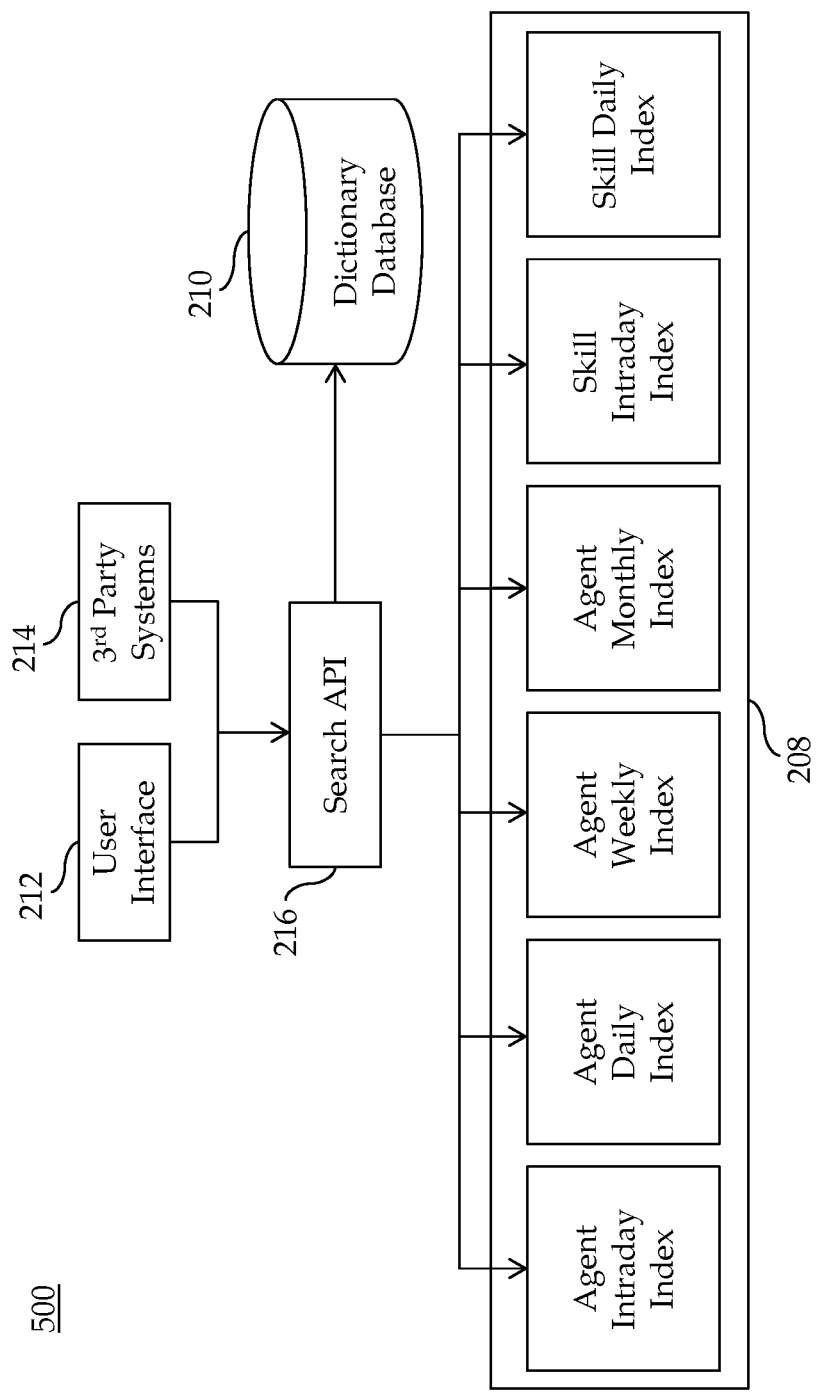
FIG. 5 illustrates block diagram of the data management system for lookup of a user search query according to an embodiment of the present invention.

FIG. 5 illustrates block diagram of the data management system 200 for performing a lookup of a user search query according to an embodiment of the present invention. The data management system 200 has a user interface 212 that is configured to receive one or more search queries from a user. The user triggers a search query by using the user interface 212 or the third party systems 214, for example, get agent "Mike Lewis" daily ACD calls bigger than 100 today. In an embodiment of the present invention, the search query may be a SQL query. In another embodiment of the invention, the query may be formed in other query languages, but is not limited to SQL, Java Persistence Query Language (JPQL), or Query By Example (QBE). The query may be any other query in another embodiment of the present invention. The data management system 200 segments the search query into different phrases. In this case, the different phrases of the search query may include Agent+Mike Lewis+Daily+ACD calls+bigger than+100+today. Each phrase of the search query is then matched with a dictionary item and the phrases that match with the dictionary items are parsed by the search API 216 in order to match a specific index in the indexing server 208.

The indexing server 208 then performs one or more lookups in different indexes of the indexing server 208 in order to retrieve relevant results. In this case, the search API 216 may perform the lookup for each of the phrases in the indexes of the indexing server 208. The search API 216 may perform the lookup for the phrase "Agent" in the index having a contact center reporting entity for example, agent daily index 304-2, then inside the agent daily index 304-2 the phrase "daily" is searched. A statistic of the phrase "ACD calls" is searched in the column of the agent daily index 304-2, and the phrase "Today" is matched to today's time stamp (date and time), and data with number of calls bigger than 100 are filtered. The phrase "Mike Lewis" is a name of an agent whose data is to be retrieved, and therefore the phrase is then displayed as it is in a search result.

Therefore, the search result may be displayed on the user interface 212 that may display the result in an order such as, Agent name+agent ID+statistic name+statistic value+ time stamp By using the above mentioned order, the user interface 212 may show a full statistical description from the dictionary database 210, for example the result may be displayed as:
Mike Lewis 5555 ACD calls 1000 03/01/2013
ACD calls: The number of calls that were distributed to the agent through the ACD and were answered.

First row of the search result may be a highest matching record and second row of the search result may display additional statistics from the same time stamp for the agent (i.e., business definition of the reporting statistic ACD calls).

Figure 6:
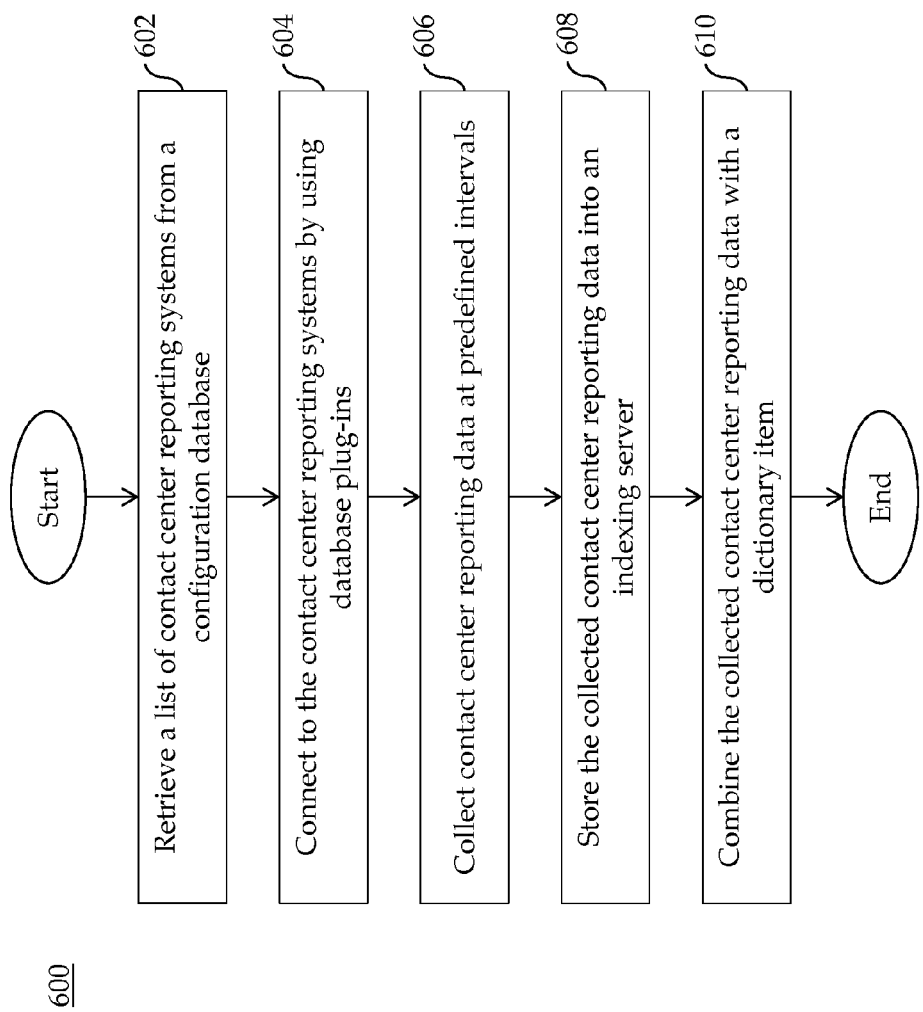
FIG. 6 depicts a flowchart of a method for indexing the reporting data according to an embodiment of the present invention.

FIG. 6 depicts a flowchart of a method 600 for indexing reporting data of the contact center according to an embodiment of the present invention.

At step 602, a data management system 200 retrieves a list of contact center reporting systems from a configuration database in an embodiment of the present invention. The list of the contact center reporting systems may include a list of plurality of contact center systems from which reporting data is to be retrieved. In an embodiment of the present invention, the reporting data may include, but is not restricted to, historical data of the contact center that may be a static data. The plurality of contact center reporting systems may include reporting data such as, but is not restricted to, information related to customers, agent's behavior, call recordings, workforce management, and so forth.

In another embodiment of the present invention, the data management system 200 may retrieve one or more connection details of the reporting systems from the configuration database. The connection details may include, but is not restricted to, an Internet Protocol address (IP address), hostnames, communication protocols, input/output ports, usernames, and passwords. In an embodiment of the present invention, the crawler is configured to retrieve the connection details and list of contact center reporting systems from the configuration database.

At step 604, the data management system 200 enables the crawler to connect with the plurality of reporting systems of the contact center in an embodiment of the present invention. The data management system 200 uses a plurality of database plug-in interfaces to connect the crawler of the data management system 200 to the plurality of reporting systems for retrieving the historical reporting data. The plurality of database plug-in interfaces may include, but is not restricted to, a database plug-in interface to a Microsoft Structured Query Language (MSSQL) database, a database plug-in interface to an ORACLE database, and so forth. For example, if the reporting system stores a table with data of 50 different callers, then the database plug-in interfaces for retrieving structure of the table as it is from the reporting system and transmits it to the crawler of the reporting data index system.

At step 606, the data management system 200 collects the reporting data from the plurality of contact center reporting systems at predefined interval in an embodiment of the present invention. The predefined intervals may include, but is not restricted to, an intra daily interval, a daily interval, a weekly interval, and a monthly interval. In the intra daily interval, the reporting data is retrieved periodically from the reporting system at predefined time interval for example, 1 minute, 15 minutes, 30 minutes, and so forth. In the daily interval, the reporting data is retrieved once a day and includes a single record for the day the customer report on. Next, in the weekly interval, the reporting data is retrieved once a week from the contact center reporting systems. Further, in the monthly interval, the reporting data is retrieved once a month from the contact center reporting systems. In another embodiment of the present invention, the data management system 200 may collect the reporting data from the contact center reporting systems that are included in the list of the contact center reporting systems retrieved from the configuration database.

At step 608, the data management system 200 stores the collected contact center reporting data into an indexing server in an embodiment of the present invention. The indexing server receives the contact center reporting data from the crawler and at the end of a day stores the contact center reporting data in a memory index of the indexing server. For example, if a database table having information of 50 callers is stored in a memory index of the indexing server, the data management system 200 provides an ability to the user to access the reporting data in a much faster way.

At step 610, the data management system 200 combines the collected reporting data together with one or more dictionary items of a dictionary database in an embodiment of the present invention. The dictionary database may include, but is not restricted to, business definitions of reporting entities in an embodiment of the present invention. The reporting entities may include, but is not restricted to, element types (e.g., agent, skill etc.), index type (e.g., intraday, daily, weekly or monthly), reporting statistics (e.g., ACD calls, ACD abandoned calls etc.), time stamps (e.g., date and time), and mathematical operators (e.g., bigger than, smaller than etc.). In another embodiment of the present invention, the dictionary database may get updated at predefined time interval that is configured based on predefined configurations of a user.

Figure 7:
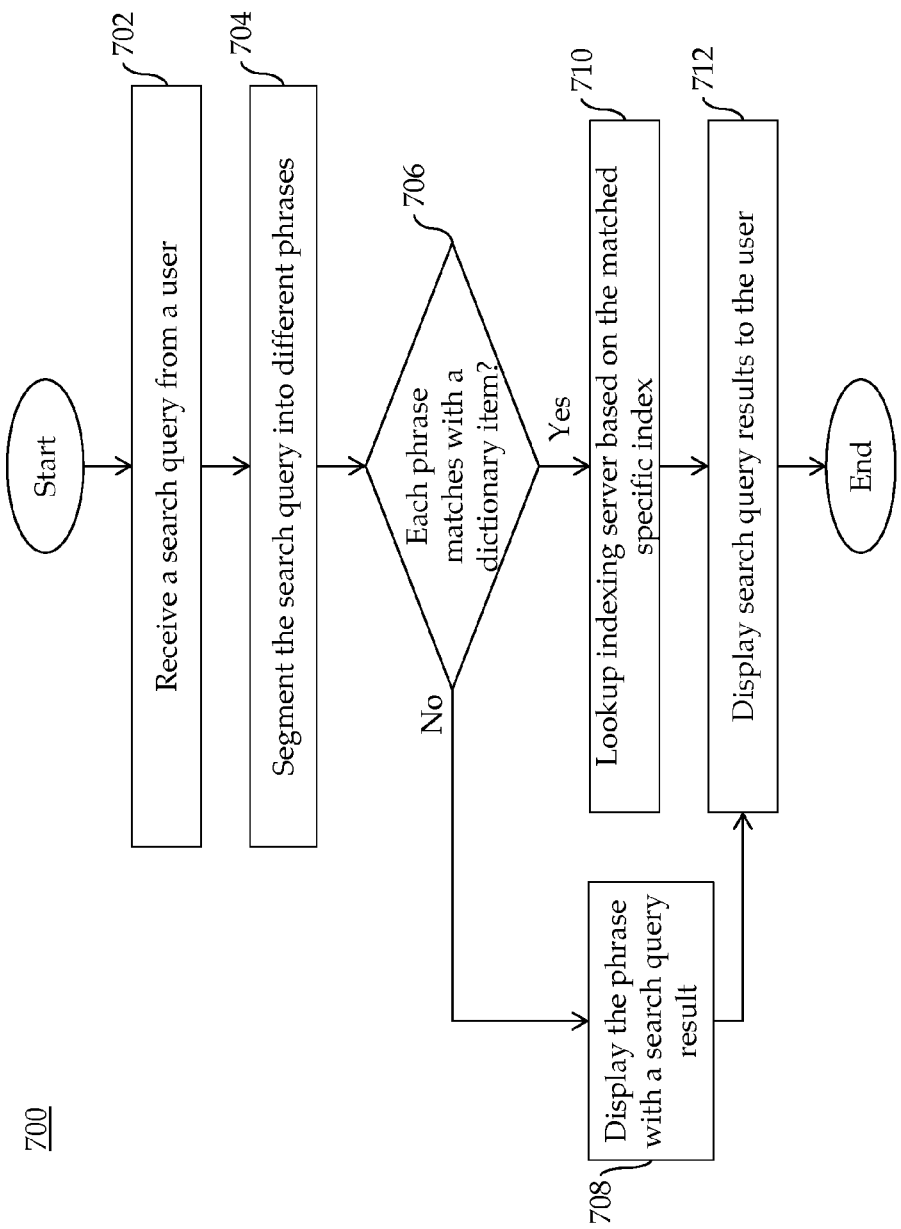
FIG. 7 depicts a flowchart of a method for performing a lookup and displaying result to a user based on a search query received from the user according to an embodiment of the present invention.

FIG. 7 depicts a flowchart of a method for performing a lookup and displaying a result to a user based on a search query received from the user according to an embodiment of the present invention.

At step 702, a data management system 200 receives a search query from a user in an embodiment of the present invention. The user may be an agent or a supervisor of the contact center in an embodiment of the present invention. The user triggers a search query, using a user interface or third party systems, for example, get agent "Mike Lewis" daily ACD calls bigger than 100 today. In an embodiment of the present invention, the search query may be a SQL query. In another embodiment of the invention, the query may be formed in other query languages, but is not limited to SQL, Java Persistence Query Language (JPQL), or Query By Example (QBE).

At step 704, the data management system 200 segments the user search query into different words or phrases in an embodiment of the present invention. The user search query "agent Mike Lewis daily ACD calls bigger than 100 today" is segmented into different phrases and may include different phrases such as, Agent+Mike Lewis+Daily+ACD calls+ bigger than+100+today. Further, the data management system 200 describes the roles of each of the phrases by using the dictionary database. For example, the phrase "Agent" is a contact center reporting entity type, the phrase "daily" is matched to a daily index type, the phrase "ACD calls" is matched to ACD calls reporting statistics type, the phrase "today" is matched to a time stamp, and the phrase "bigger than" is mapped to a mathematical operator ">".

At step 706, the data management system 200 determines whether each of the phrases of the search query is matched with the dictionary items. In an embodiment of the present invention, the dictionary items may include business names of the reporting entities that are stored in the dictionary database. In another embodiment of the present invention, the dictionary items may include English words of a dictionary. When it is determined that each phrase is matched with the dictionary items, the method 700 proceeds towards step 710. When any of the phrase does not match with the dictionary items, the method 700 proceeds towards step 708.

At step 708, the data management system 200 may display the phrase that does not match with the dictionary items as it is with a search query result. For example, the phrase "Mike Lewis" is a name of an agent whose data is to be retrieved. Therefore, this phrase may be displayed as it is in a search result.

At step 710, the data management system 200 performs lookup for each of the phrases across a plurality of indexes of the indexing server 208 in an embodiment of the present invention. The data management system 200 may perform lookup for the phrase "Agent" in an agent index having reporting data for a contact center reporting entity (agent), and then inside the agent daily index the phrase "daily" is searched. Then the data management system 200 may perform lookup for a reporting statistic of the phrase ACD calls" in the agent daily index, and the reporting data of the phrase "Today" is matched with a time stamp (date and time), and reporting data with number of calls bigger than 100 are filtered.

At step 712, the data management system 200 displays the search query result to the user. In an embodiment of the present invention, the search query result is displayed in the user interface of the data management system 200. The search result may be displayed in an order, for example, Agent name+agent ID+statistic name+statistic value+ time stamp By using the above mentioned order, the user interface may show a full statistical description from the dictionary database as for example, Mike Lewis 5555 ACD calls 1000 03/01/2013

ACD calls: The number of calls that were distributed to the agent through the ACD and were answered.

In an embodiment of the present invention, first row of the search result may be a highest matching record and second row of the search result may display additional statistics from the same time stamp for the agent (i.e., business definition of the reporting statistic ACD calls).

The exemplary systems and methods of this present invention have been described in relation to a contact center. However, to avoid unnecessarily obscuring the present invention, the preceding description omits a number of known structures and devices. This omission is not to be construed as a limitation of the scope of the present invention. Specific details are set forth to provide an understanding of the present invention. It should however be appreciated that the present invention may be practiced in a variety of ways beyond the specific detail set forth herein.

Furthermore, while the exemplary embodiments of the present invention illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a switch, server, and/or adjunct, or collocated on a particular node of a distributed network, such as an analog and/or digital telecommunications network, a packet-switch network, or a circuit-switched network.

It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the present invention.

A number of variations and modifications of the present invention can be used. It would be possible to provide for some features of the present invention without providing others.

For example in one alternative embodiment of the present invention, the systems and methods of this present invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like.

In general, any device(s) or means capable of implementing the methodology illustrated herein can be used to implement the various aspects of this present invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, non-volatile storage, input devices, and output devices. Furthermore, alternative software implementations including, but not limited to, distributed processing or component/object distributed processing, parallel processing, or virtual machine processing can also be constructed to implement the methods described herein.

In yet another embodiment of the present invention, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this present invention is dependent on the speed and/or efficiency requirements of the system, the particular function, and the particular software or hardware systems or microprocessor or microcomputer systems being utilized.

In yet another embodiment of the present invention, the disclosed methods may be partially implemented in software that can be stored on a storage medium, executed on programmed general-purpose computer with the cooperation of a controller and memory, a special purpose computer, a microprocessor, or the like. In these instances, the systems and methods of this present invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the present invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the present invention has been presented for purposes of illustration and description. The foregoing is not intended to limit the present invention to the form or forms disclosed herein. In the foregoing Detailed Description for example, various features of the present invention are grouped together in one or more embodiments, configurations, or aspects for the purpose of streamlining the disclosure. The features of the embodiments, configurations, or aspects of the present invention may be combined in alternate embodiments, configurations, or aspects other than those discussed above. This method of disclosure is not to be interpreted as reflecting an intention that the present invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A data management system for indexing reporting data of a contact center, the data management system comprising:
   a plurality of reporting systems of the contact center storing the reporting data of the contact center;
   a database storing a plurality of database plug-in interfaces, each database plug-in interface associated with a respective one of the plurality of reporting systems of the contact center, each database plug-in interface different than others of the plurality of database plug-in interfaces;
   a computer, comprising:
      a memory device storing executable instructions, and
      a processor in communication with the memory device, wherein the processor when executing the executable instructions:
         for each particular one of the plurality of reporting systems:
            retrieves the database plug-in interface associated with the particular one reporting system;
            connects with the particular one reporting system using the associated database plug-in interface;
            collects respective reporting data from the particular one reporting system; and
            sends the collected respective reporting data to an indexing server of the contact center.

2. The data management system of claim 1, wherein the reporting data comprises one or more of information related to at least one of customers and agent's behavior, call recordings, or workforce management.

3. The data management system of claim 1, wherein the processor when executing the executable instructions retrieves a list of the plurality of reporting systems from a configuration database.

4. The data management system of claim 1, wherein the processor when executing the executable instructions retrieves respective connection details of the plurality of reporting systems from the configuration database.

5. The data management system of claim 1, wherein the respective connection details comprise one or more of: An Internet Protocol (IP) address, a hostname, a communication protocol, or a username and a password.

6. The data management system of claim 1, wherein the processor when executing the executable instructions collects the respective reporting data at predefined intervals.

7. The data management system of claim 6, wherein the predefined intervals comprise one or more of an intra daily interval, a daily interval, a weekly interval, or a monthly interval.

8. The data management system of claim 1, further comprising:
 a dictionary database storing a plurality of business definitions of the reporting data as one or more dictionary items.

9. The data management system of claim 1, comprising:
 the indexing server,
  wherein the indexing server combines the collected respective reporting data with the one or more dictionary items.

10. A computer-implemented method for indexing reporting data of a contact center, the method comprising:
 retrieving, by a computer of the contact center, a list of a plurality of reporting systems of the contact center from a configuration database, wherein the configuration database stores a plurality of database plug-in interfaces, each database plug-in interface associated with a respective one of the plurality of reporting systems of the contact center, each database plug-in interface different than others of the plurality of database plug-in interfaces;
 for each particular one of the plurality of reporting systems:
  retrieving, by the computer of the contact center, respective connection details for the particular one of the plurality of reporting systems from the configuration database, wherein the respective connection details comprise data identifying the database plug-in interface associated with the particular one of the plurality of reporting systems;
  connecting, by the computer of the contact center, to the particular one of the plurality of reporting systems based on the respective connection details;
  collecting, by the computer of the contact center, the reporting data at predefined intervals from the particular one of the plurality of reporting systems; and
  storing, by the computer of the contact center, the collected reporting data into an indexing server, wherein the collected reporting data is stored along with one or more dictionary items.

11. The method of claim 10, wherein the reporting data comprises one or more of information related to at least one of customers and agent's behavior, call recordings, or workforce management.

12. The method of claim 10, wherein the respective connection details comprise one or more of an Internet Protocol (IP) address, a hostname, a communication protocol, or a username and a password for authenticating with the plurality of reporting systems.

13. The method of claim 10, wherein the predefined interval comprise one or more of a intra daily interval, a daily interval, a weekly interval, or a monthly interval.

14. The method of claim 10, wherein the dictionary items comprise one or more business definitions related to the reporting data.

* * * * *